Jan. 6. 1925.
A. C. MAYER
ADJUSTABLE TRAP
Filed May 26, 1924
1,521,900
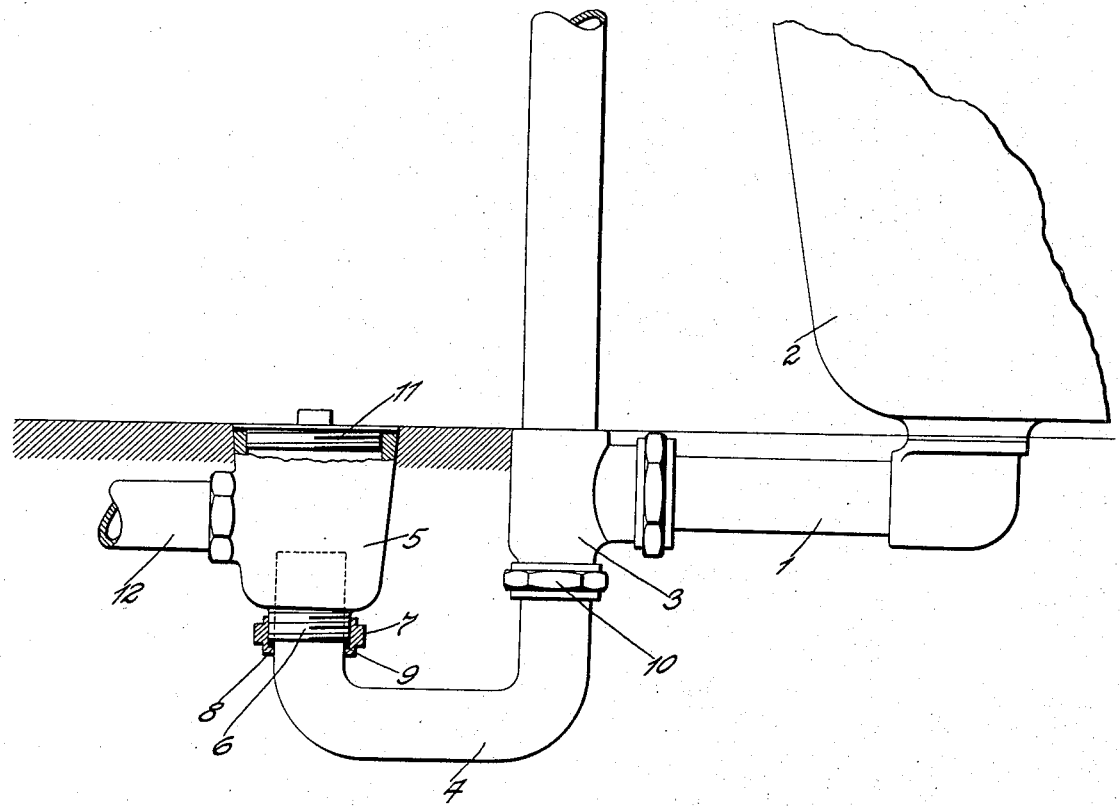
Inventor:
Albert C. Mayer,
by Rippey Kingsland,
His Attorneys.

Patented Jan. 6, 1925.

1,521,900

UNITED STATES PATENT OFFICE.

ALBERT C. MAYER, OF ST. LOUIS, MISSOURI.

ADJUSTABLE TRAP.

Application filed May 26, 1924. Serial No. 715,853.

*To all whom it may concern:*

Be it known that I, ALBERT C. MAYER, a citizen of the United States, residing at St. Louis, Missouri, have invented a new and useful Adjustable Trap, of which the following is a specification.

This invention relates to adjustable traps for use in connection with bath tubs and other receptacles, and is specially designed and adapted for connection with built-in bath tubs.

An object of the invention is to provide a trap having a wide range of adjustability whereby it may be conveniently connected with a receptacle whether the receptacle is a built-in bath tub or is otherwise arranged.

The drawing illustrates the invention in connection with a built-in receptacle.

As shown a horizontal pipe 1 has one end connected with the receptacle 2 and the other end opening into one arm of the elbow 3. The outlet arm of the elbow 3 opens downwardly and has adjustable connection with one of the arms of a U-shaped trap 4. The other upwardly extending arm of the U-shaped trap 4 extends upwardly into a clean out chamber or well 5 shown as imbedded in the floor. The hole through which the arm of the trap 4 extends into the well 5 is surrounded by an exteriorly threaded extension 6 on which a nut 7 is screwed. The lower end of the nut 7 has an internal flange 8 the edge of which fits properly against the outside of the trap 4 and which supports a ring of packing 9 and compresses the same against the end of the extension 4 and around the trap to provide an impervious joint. Before the nut 7 is joined the arm of the trap 4 may be slipped to any desired position in the well 5, thus permitting a wide range of adjustability and facilitating the connection of the parts. The joints 10 connecting the trap 4 with the elbow 3 may be of like construction.

The cap 11 is flush with the floor surface and is removable to afford access to the well.

The outlet pipe 12 from the well 5 is wholly below the floor surface.

From the foregoing description it is apparent that my invention obtains its intended objects and purposes, may be economically manufactured and is capable of satisfactory use in places where traps incapable of such adjustability could not be satisfactorily used.

What I claim and desire to secure by Letters Patent is:—

1. A trap comprising a U-shaped member both arms of which are vertical and open upwardly through the ends thereof and both arms of which are smooth on their outer surfaces from the upper ends downwardly, a well into which one arm of said member extends for sliding adjustment, and releasable devices having threaded connection with said well and forming an impervious joint between the well and the trap.

2. A trap comprising a U-shaped member both arms of which open vertically at their upper ends and both of which arms have smooth outer surfaces from their upper ends downwardly, an inlet member into which one arm of said U-shaped member extends for sliding adjustment, a releasable device supported by said inlet member and forming an impervious joint between said two members, a well into which the other arm of said U-shaped member extends for sliding adjustment, and a releasable device supported by said well and forming an impervious joint between said well and said U-shaped member.

ALBERT C. MAYER.